US010068008B2

United States Patent
Udupa et al.

(10) Patent No.: US 10,068,008 B2
(45) Date of Patent: Sep. 4, 2018

(54) SPELLING CORRECTION OF EMAIL QUERIES

(71) Applicant: Microsoft Technology Licensing, LLC, Redmond, WA (US)

(72) Inventors: Raghavendra Uppinakuduru Udupa, Bangalore (IN); Abhijit Narendra Bhole, Gujarat (IN)

(73) Assignee: Microsoft Technologies Licensing, LLC, Redmond, WA (US)

( * ) Notice: Subject to any disclaimer, the term of this patent is extended or adjusted under 35 U.S.C. 154(b) by 289 days.

(21) Appl. No.: 14/471,886

(22) Filed: Aug. 28, 2014

(65) Prior Publication Data

US 2016/0063094 A1 Mar. 3, 2016

(51) Int. Cl.
*G06F 17/27* (2006.01)
*G06F 17/30* (2006.01)
*G06Q 10/10* (2012.01)
*H04L 12/58* (2006.01)

(52) U.S. Cl.
CPC ...... *G06F 17/30675* (2013.01); *G06F 17/277* (2013.01); *G06F 17/3064* (2013.01); *G06Q 10/107* (2013.01); *H04L 51/22* (2013.01)

(58) Field of Classification Search
CPC ............... G06F 17/277; G06F 17/3053; G06F 17/30554; G06F 17/3064; G06F 17/30675; G06F 17/30867; G06Q 10/107; H04L 51/22
See application file for complete search history.

(56) References Cited

U.S. PATENT DOCUMENTS

| 6,349,295 B1 * | 2/2002 | Tedesco ................ G06F 17/273 |
| 6,701,362 B1 * | 3/2004 | Subramonian .......... H04L 29/06 709/224 |
| 7,254,774 B2 | 8/2007 | Cucerzan et al. |

(Continued)

FOREIGN PATENT DOCUMENTS

WO    WO2013032617    3/2013

OTHER PUBLICATIONS

"International Search Report & Written Opinion Issued in PCT Application No. PCT/US2015/046194", dated Nov. 27, 2015, 12 Pages.

(Continued)

*Primary Examiner* — Jorge A Casanova

(57) ABSTRACT

Techniques and constructs to facilitate spelling correction of email queries can leverage features of email data to obtain candidate corrections particular to the email data being queried. The constructs may enable accurate spelling correction of email queries across languages and domains based on, for example, one or more of a language model such as a bigram language model and/or a normalized token IDF based language model, a translation model such as an edit distance translation model and/or a fuzzy match translation model, content-based features, and/or contextual features. Content-based features can include features associated with the subject line of emails, content including identified phrases, contacts, and/or the number of candidate emails returned. Contextual features can include a time window of subject match and/or contact match, a frequency of emails received from a contact, and/or device characteristics.

20 Claims, 9 Drawing Sheets

(56) References Cited

U.S. PATENT DOCUMENTS

| | | | |
|---|---|---|---|
| 7,672,927 B1* | 3/2010 | Borkovsky | G06F 17/30672 707/999.003 |
| 7,769,804 B2 | 8/2010 | Church et al. | |
| 7,899,871 B1* | 3/2011 | Kumar | G06Q 10/107 709/206 |
| 8,225,203 B2 | 7/2012 | Unruh | |
| 8,510,322 B2 | 8/2013 | Ray et al. | |
| 8,713,042 B1* | 4/2014 | Zinenko | G06F 17/30864 707/759 |
| 2006/0161520 A1* | 7/2006 | Brewer | G06F 17/3064 |
| 2006/0195435 A1* | 8/2006 | Laird-McConnell | G06F 17/30389 |
| 2009/0249198 A1 | 10/2009 | Davis et al. | |
| 2010/0010977 A1 | 1/2010 | Choi et al. | |
| 2011/0154221 A1 | 6/2011 | DeLuca et al. | |
| 2012/0023107 A1* | 1/2012 | Nachnani | G06F 17/30303 707/748 |
| 2012/0296627 A1* | 11/2012 | Suzuki | G06F 17/27 704/2 |
| 2013/0151533 A1* | 6/2013 | Udupa | G06F 17/30646 707/742 |
| 2014/0316850 A1* | 10/2014 | Peechara | G06Q 30/0201 705/7.29 |

OTHER PUBLICATIONS

Bao, et al., "A Graph Approach to Spelling Correction in Domain-Centric Search", In the Proceedings of the 49th Annual Meeting of the Association for Computational Linguistics, Jun. 19, 2011, pp. 905-914.

Bar-Yossef, et al., "Context-Sensitive Query Auto-Completion", In the Proceedings of the 20th international conference on World wide web, Mar. 28, 2011, pp. 107-116.

Ru, et al., "Search Query Correction based on User Intent Analysis", In the Journal of Computational Information Systems, Mar. 15, 2013, pp. 2157-2166.

* cited by examiner

```
Method EditDistance(Word, OtherWord) {
  lastrow = null; currow = ComputeNextRow(Word, '^', '\0', null, null)
  OtherWord[-1] = '\0'
    for i = 0 to i < length(OtherWord) - 1
      newrow = ComputeNextRow(Word, OtherWord[i], OtherWord[i - 1], currow,
lastrow)
      lastrow = currow; currow = newrow
    return currow[length(currow) - 1] }

Method ComputeNextRow(Word, Character, LastCharacter, lastrow, lastlastrow) {
  if lastrow = null; currow[0] = 0;
    for i = 1 to length(Word)
      currow[i] = currow[i - 1] + (2.0 / 3);
      if i < length(Word) && i > 1, currow[i] = currow[i] +
max(min(FatFingerDistance(Word[i - 1], Word[i - 2]), FatFingerDistance(Word[i],
Word[i - 1])), 1) / 3
        else if i > 1, currow[i] = currow[i] + FatFingerDistance(Word[i - 1], Word[i - 2]) / 3
        else, currow[i] = currow[i] + FatFingerDistance(Word[i], Word[i - 1]) / 3
      return currow;
    else, currow[0] = lastrow[0] + (2.0 / 3) + FatFingerDistance(Character, Word[0]) / 3
    for i = 1 to length(Word), insert = currow[i - 1] + (2.0 / 3);
      if i < length(Word), insert = insert + max(min(FatFingerDistance(Character, Word[i
- 1]), FatFingerDistance(Word[i - 1], Word[i])), 1) / 3
        else, insert = insert + FatFingerDistance(Character, Word[i - 1])) / 3
      delete = lastrow[i] + (2.0 / 3);
      if i < length(Word), delete = delete + max(min(FatFingerDistance(Character,
LastCharacter), FatFingerDistance(Character, Word[i])), 1) / 3
        else, delete = delete + FatFingerDistance(Character, LastCharacter)) / 3
      if Character = Word[i - 1], substitute = lastrow[i - 1]
        else, substitute = lastrow[i - 1] + (2.0 / 3) + FatFingerDistance(Character, Word[i -
1])) / 3
      if i > 1 && LastCharacter != '\0' && Character != Word[i - 1] && lastlastrow != null
      if LastCharacter = Word[i - 1] && Character = Word[i - 2], transpose = lastlastrow[i -
2] + (2.0 / 3) + FatFingerDistance(Character, LastCharacter)) / 3
    currow[i] = min(insert, delete, substitute, transpose), return currow}

Method FatFingerDistance(Character1, Character2) {
  lines = [ "1234567890", "qwertyuiop", "asdfghjkl;", "zxcvbnm,."]
    for i = 0 to length(lines) - 1
      for j from 0 to length(lines[j]) - 1
        position[lines[i][j]] = (i, j),
        (linediff, offsetdiff) = abs(position[Character1] - positions[Character2])
          if linediff = 0 && offsetdiff = 0 { return 0}; else if linediff = 0 & offsetdiff <= 1 {
return 1}
          else if linediff = 1 && offsetdiff <= 1 { return 2}; else {return 3}}
```

SPELLING CORRECTION OF EMAIL QUERIES

BACKGROUND

Searching in email is a routine activity for many people. Search queries frequently contain spelling mistakes, which frustrates users and decreases productivity. Users often are forced to reformulate multiple queries to obtain the object of the search. However, there have been few efforts to address this problem in email search. Most email clients do not provide spelling corrections of queries. In contrast to email, most web search providers offer spelling correction for misspelled web-search queries by employing machine learning based strategies based on the logs of session data produced and made available by millions of web users.

Web-query logs are expansive, which allows machine learning strategies to provide corrections for most misspelled queries due to the sheer amount of data available, i.e., by employing "the intelligence of the crowd" to generate spelling corrections and recover the query the user intended when entering the misspelled web query. In addition, for web search, the target document collection is the same for all users—all of the documents of the web. In contrast to web-queries, search history for email is scarce and the target document collection for searching in email is limited and generally private. Thus, traditional spelling correction algorithms, such as those used for web-query, employ machine learning strategies, which are not effective on such sparse and personal data.

SUMMARY

This disclosure describes systems and methods for spelling correction of email queries. In at least one example, a ranker-based algorithm generates candidates for correcting misspelled queries, which provides personalized spelling corrections by leveraging the particular user's email data. The techniques described herein generate candidate corrections for a given email-based query from the user's email data and rank the candidates based on a set of email features.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is a listing example pseudo code for calculating edit distance as described herein.

DETAILED DESCRIPTION

Overview

Figure 1:
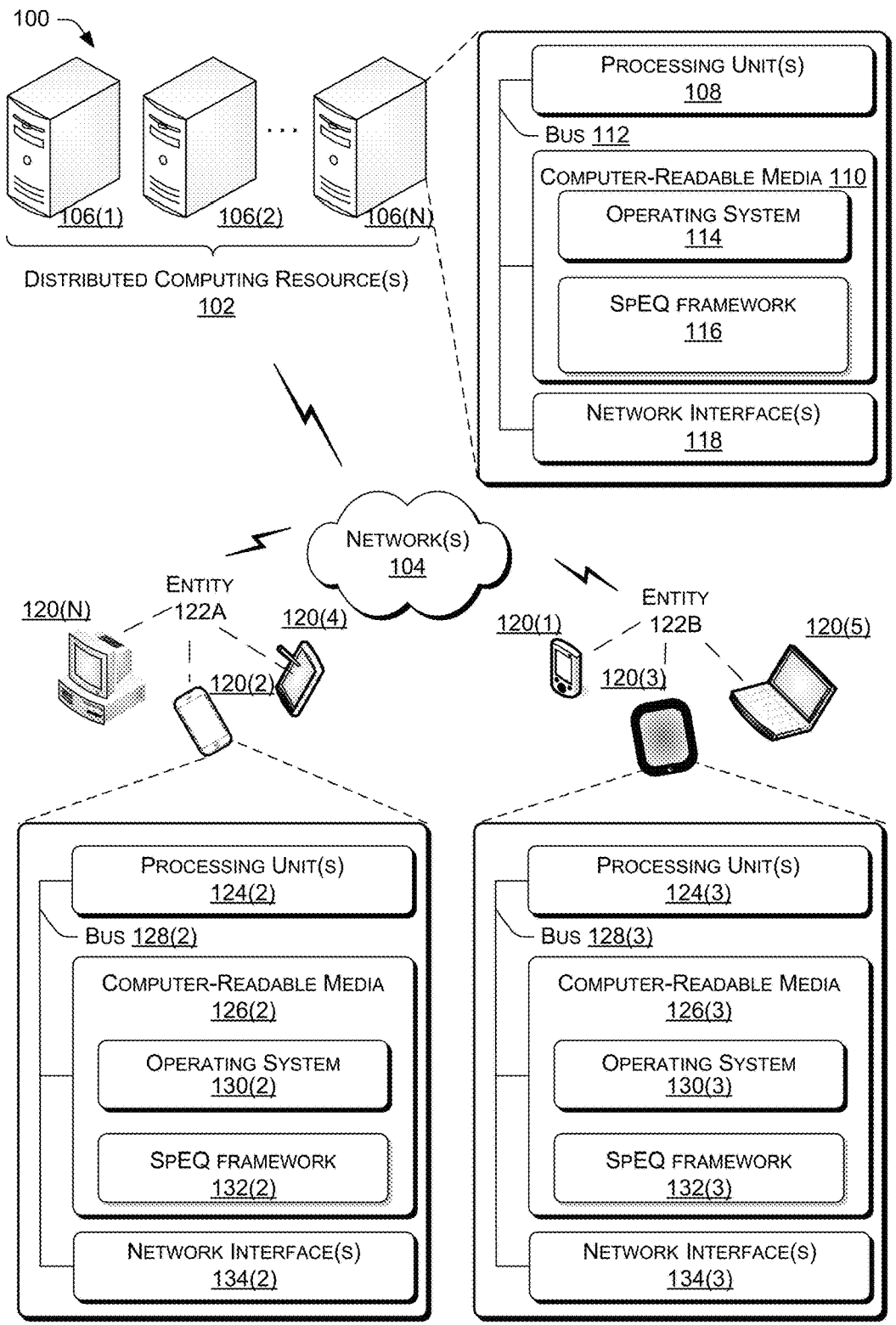
FIG. 1 is a block diagram depicting an example environment for implementing spelling correction of email queries (SpEQ) as described herein.

Examples described herein provide techniques and constructs to improve email search by optimizing spelling correction for email queries using resources including, for example, processing units and accelerators. Such resources may be implemented using specialized programming and/or hardware programmed with specific instructions to implement the specified functions. For example, resources may have different execution models as is the case for graphics processing units (GPUs) and computer processing unit (CPUs). Resources configured for spelling correction of email queries can provide personalized corrections according to a language model and a translation model, as well as a number content-based features and contextual features.

In email search the target document collection is much smaller than a collection of documents upon which web search is conducted and the massive number of session logs of web search is not available. Moreover, in email search the target document collection is unique and generally available only to that particular user. Also, users are more familiar with their email accounts than with documents on the web, and hence user search intent for searching in email can be more specific than for searching on the web. This also provides for greater personalization of corrections in email search as compared to the impersonal results of web search. For instance, a scientific collaborator of the computer scientist Peter Norvig might type the query "noarvig flies" while intending to type "norvig files" whereas an entomologist searching for emails on the subject of black fly season in the Alaskan city of Noorvik might also type "noarvig flies". Thus different users may enter the same query with different intents, and the system described herein can return candidates appropriate to the particular user's intent because the candidates are determined from target data particular to that user.

Also on the same email account, for a given a misspelled query the user might have different intents when searching in different subdivisions or folders or when searching at different times. For instance, "july patents" is a more relevant correction to the misspelled query "july parents" than "julie parents" when the user is searching the subdivision or folder containing emails received from the company's intellectual property attorneys. However "julie parents" would be more appropriate when searching in a personal email subdivision or folder or if the user recently received a mail from Julie's parents. Such correction would not be possible using a query log based approach, which makes it infeasible to adapt web query correction algorithms to email search.

In various examples, the algorithm for spelling correction of queries in email search as described herein can correct misspelled queries even when a user's email search history is not available for training on the user's email data. In various examples, the algorithm for spelling correction of queries in email search as described herein can give personalized corrections specific to the user's email account. In various examples, the algorithm for spelling correction of queries in email search as described herein can give corrections based on the most current state of the user's email account. In some examples, the algorithm for spelling correction of queries in email search as described herein can give corrections based on a computing device, such as a smart phone, a tablet, a desktop computer, etc., having one or more input devices, such as a physical keyboard, a soft keyboard, a touch screen, a touch pad, microphone(s), camera(s), etc. to provide personalized device optimized correction.

At least one example implementation includes generating the candidates for correction from the user's email data itself. For a given query there can be many such candidates and the algorithm can identify candidates the user might have had in mind when inputting the misspelled query. However, not all candidates are equally likely to be used as a search query by the user.

SpEQ can leverage information specific to searching in emails, for example, search intent for a particular email or emails or search intent for an attachment to a particular email. In email search, users frequently use phrases from subject lines, entity, contact or distribution names, attachment names, links, and other such cues to describe their search intent. Similarly users are more likely to search for emails from an entity or contact they interact with regularly. Users may also be more likely to search for emails that arrived recently. Thus some candidates are more likely to match the user's intent than others depending on how they occur in the user's email account.

SpEQ can score these candidates using cues from the user's email account to identify the intended query. In addition, SpEQ can use a dynamic programming algorithm to avoid combinatorial explosion during candidate generation. Moreover, SpEQ can use a statistical ranker for ranking the candidates. SpEQ uses a ranker based approach and defines or determines features to take into account lexical similarity with the misspelled query and cues from the user's email account. The defined or determined features generalize over email accounts of multiple domains and are efficient and practical to compute. The weights for the features can be obtained by training on sample offline training data and the resulting model can be used to provide corrections on any user's email account. Examples are presented in greater detail in the description of the following figures.

Experiments employing the techniques described herein on public domain email corpora show that, compared to two baselines, a naive generative model adaptation and spelling corrections provided by GMAIL, (i) SpEQ performs 10% better than the naïve generative model adaption and 6.41% better than spelling corrections provided by GMAIL, and (ii) SpEQ provides personalized and context sensitive corrections on user's email accounts. Example experimental results are presented in greater detail in the description of the following figures.

Examples described herein provide techniques and constructs applicable to spelling correction of email queries. In various instances, a processing unit configured via programming from modules or APIs to perform techniques as described herein can include one or more of a GPU, a field-programmable gate array (FPGA), another class of digital signal processor (DSP), or other hardware logic components that may, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Various examples, scenarios, and aspects are described further with reference to FIGS. 1-8.

Illustrative Environment

FIG. 1 shows an example environment 100 in which examples of spelling correction of email queries (SpEQ) can operate. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile-type devices, special purpose-type devices, embedded-type devices, and/or wearable-type devices. Thus, although illustrated as desktop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on computer-readable media 110 can include, for example, an operating system 114, a SpEQ framework 116, and other modules, programs, or applications that are loadable and executable by processing units(s) 108. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device 106 can also include one or more network interfaces 118 to enable communications between computing device 106 and other networked devices such as client computing device(s) 120 involved in SpEQ, or other device(s) 106 over network(s) 104. Such network interface(s) 118 can include one or more network interface controllers (NICs) or other types of transceiver devices to send and receive communications over a network. For simplicity, other components are omitted from the illustrated device 106.

Other devices involved in SpEQ can include client computing devices, for example one or more of devices 120(1)-120(N). Device(s) 120 can belong to a variety of categories or classes of devices, which can be the same as or different from devices 106, such as traditional client-type devices, desktop computer-type devices, mobile-type devices, special purpose-type devices, embedded-type devices, and/or wearable-type devices. Thus, although illustrated as mobile computing devices, which may have less computing resources than device(s) 106, client computing device(s) 120 can include a diverse variety of device types and are not limited to any particular type of device. Client computing device(s) 120 can include, but are not limited to, computer navigation type client computing devices 120(1) such as satellite-based navigation systems including global positioning system (GPS) devices and other satellite-based navigation system devices, telecommunication devices such as mobile phone 120(2), tablet computers 120(3), mobile phone tablet hybrid, personal data assistants (PDAs) 120(4), laptop computers such as 120(5), other mobile computers, wearable computers, implanted computing devices, desktop computers, personal computers 120(N), automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device configured to receive user input. Moreover, an entity 122 can be associated with one or more client computing devices 120. Entity 122 can include a particular user and one or more designees of the user such as an assistant of the user, a supervisor of the user, a spouse of the user, a parent of the user, and/or another entity to whom the user grants permission to access the particular user's email or client device(s) 120.

Client computing device(s) 120 of the various categories or classes and device types such as the illustrated mobile phone 120(2) and tablet computer 120(3) can represent any type of computing device having one or more processing unit(s) 124 operably connected to computer-readable media 126 such as via a bus 128, which in some instances can include one or more of a system bus, a data bus, an address bus, a PCI bus, a Mini-PCI bus, and any variety of local, peripheral, and/or independent buses.

Executable instructions stored on computer-readable media 126 can include, for example, an operating system 130, a SpEQ framework 132, and other modules, programs, or applications that are loadable and executable by processing units(s) 124. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Client computing devices 120 can also include one or more network interfaces 134 to enable communications between client computing device 120 and other networked devices such as other client computing device(s) 120 or devices 106 over network(s) 104. Such network interface(s) 134 can include one or more network interface controllers (NICs) or other types of transceiver devices to send and receive communications over a network.

Figure 2:
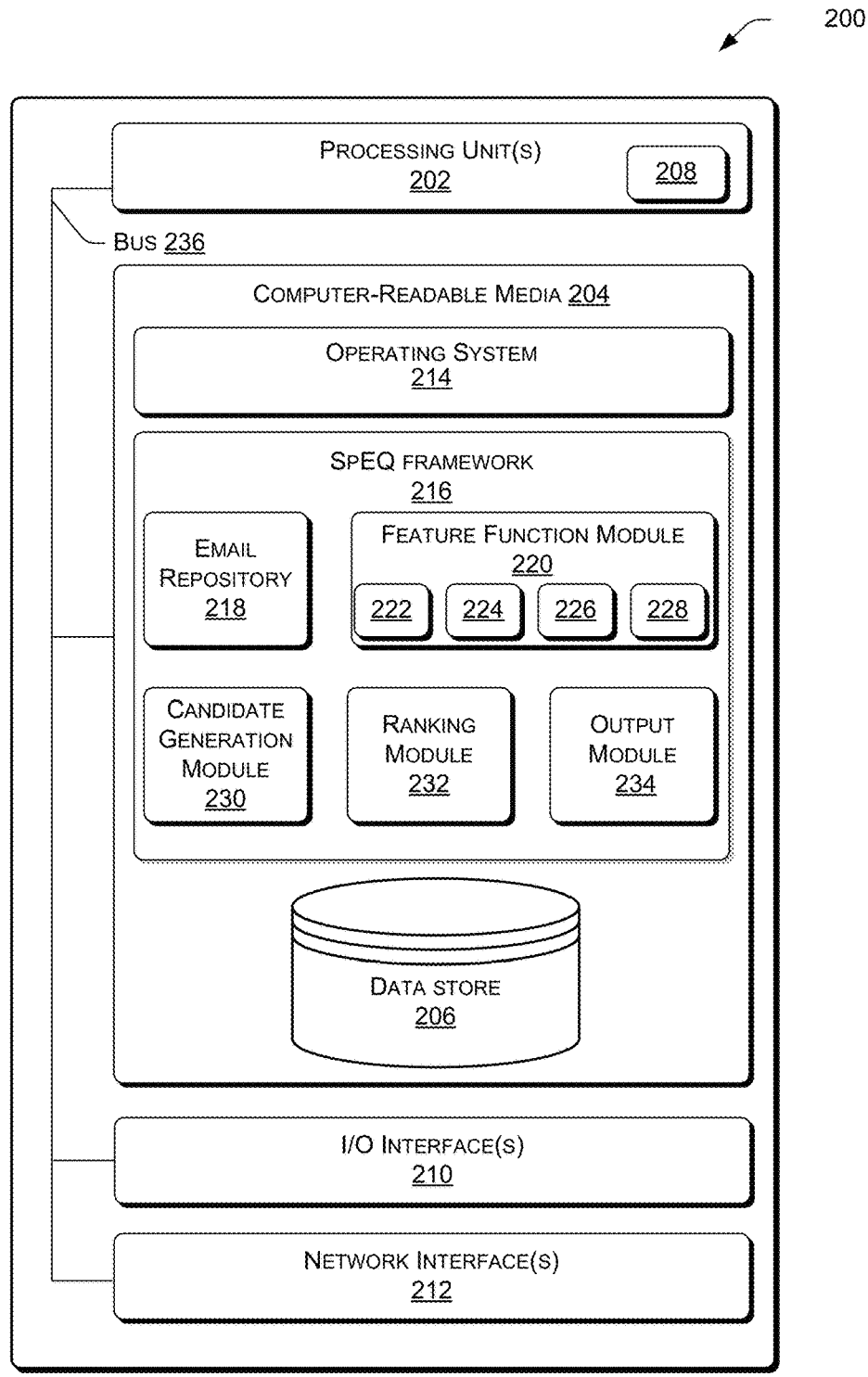
FIG. 2 is a block diagram depicting an example computing device of a distributed computing resource.

FIG. 2 is a block diagram depicting an example computing device 200 of a distributed computing resource, such as a device 106 from FIG. 1. In device(s) 200, processing unit(s) 202, can be processing unit(s) 108 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, computer-readable media 204 can be computer-readable media 110 and can store instructions executable by the processing unit(s) 202, which as discussed above, can represent a processing unit incorporated in device 200. Computer-readable media 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 200, while in some examples one or more of a CPU, GPU, and/or accelerator is external to device 200.

In the illustrated example, computer-readable media 204 also includes a data store 206. In some examples, data store 206 includes data storage such as a database, data warehouse, or other type of structured or unstructured data storage. In some examples, data store 206 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 206 can store data for the operations of processes, applications, components, and/or modules stored in computer-readable media 204 and/or executed by processing unit(s) and/or accelerator(s) 202. Alternately, some or all of the above-referenced data can be stored on separate memories 208 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 210 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 212, which can be network interface(s) 118, can represent, for example, network interface controllers (NICs) or other types of transceiver devices to send and receive communications over a network.

In the illustrated example, computer-readable media 204 also includes an operating system 214, which can be operating system 114. Computer-readable media 204 also includes a SpEQ framework 216, which can be SpEQ framework 116. SpEQ framework 216 can include one or more modules and/or APIs, which are illustrated as blocks 218, 220, 222, 224, 226, 228, 230, 232, and 234, although this is just an example, and the number can vary higher or lower.

Functionality described associated with blocks 218, 220, 222, 224, 226, 228, 230, 232, and 234 can be combined to be performed by a fewer number of modules and/or APIs or it can be split and performed by a larger number of modules and/or APIs. For example, block 218 can represent an email repository module with logic to program processing unit 202 of device 200 for extraction of one or more emails, such as emails from an email repository stored in data store 206 or an external data store. In some examples, the email repository module 218 further includes logic to distinguish between emails associated with various client devices 120 and/or various entities, for example, entities 122A and 122B.

User queries generally include one or more sub phrases containing closely related tokens, an aspect which is not captured fully by a language model learnt on small data such as email data from a single user. Based on this insight, SpEQ can define or determine a number of feature functions. For example, SpEQ can define or determine four feature functions, which are evaluated on the email data from which the candidate will be returned as a result when the feature functions are used in a query. Block 220 can represent a feature function module with logic to program processing unit 202 for identifying features in email data, such as email data from an email repository stored in data store 206 and/or as extracted by email repository module 218. Feature function module 220 can include logic for one or more feature functions $\Phi$, such as for a language model module 222, a translation model module 224, a content-based feature module 226, and a contextual feature module 228 to identify certain features in email data. More particularly, for an input query $Q_t$ the feature functions $\{\Phi_i\}$ 222, 224, 226, and 228 can score the candidate based on the particular context or lexical cue which is being measured. The feature functions SpEQ employs are computationally efficient and can be computed for any query, entity, user, language and/or domain. SpEQ can categorize the feature functions measuring lexical similarity in translation model features by translation model module 224, the context from the query in language model features by language model module 222, the context from the user email data in content-based features by content-based feature module 226, and the search context in contextual features by contextual feature module 228.

Block 230 can represent a candidate generation module with logic to program processing unit 202 for generating candidate corrections corresponding to a given query. Unlike web search, where query logs are available, candidate corrections generated by candidate correction module 230 come from the user data rather than from leveraging rewritten queries which resulted in a click for the original misspelled query as in web search. Instead, candidate correction module 230 can leverage features identified in the user's email data. For example, if a candidate doesn't fetch any mail results, the candidate can be omitted from the process of ranking.

Block 232 can represent a ranking module with logic to program processing unit 202 for ranking candidate corrections to provide personalized and context sensitive corrections on users email data. In various examples block 232 represents logic for computing a weighted score for the language model 222, the translation model 224, the content-based features 226, and/or the contextual features 228 identified by feature function module 220. In at least one example, the sum of these weighted scores provides a final score for ranking the respective candidate corrections.

Block 234 can represent an output module with logic to program processing unit 202 of device 200 to cause presentation of the candidate corrections and matching email to an appropriate input/output interface 210 and/or network interface 212.

Bus 236, which can be bus 112 and which in some instances, can include one or more of a system bus, a data bus, an address bus, a PCI bus, a Mini-PCI bus, and any variety of local, peripheral, and/or independent buses, can operably connect computer-readable media 204 to processing unit(s) 202.

Block 222 can represent a language model module with logic to program processing unit 202 for scoring candidate corrections such as those generated by candidate generation module 230. Examples of the one or more appropriate language models include a bigram language model and a normalized token inverse document frequency (IDF) model. The bigram language model feature function can score the candidate correction using a bigram language model computed from the user's email data. SpEQ can use a sliding window for computing the bigram counts. Further, SpEQ can discount the raw bigram counts using any appropriate discounting technique such as Kneser-Ney discounting. The normalized token IDF feature function can score the candidates according to an average of inverse document frequency (IDF) normalized with a maximum value.

Block 224 can represent a translation model module with logic to program processing unit 202 for scoring lexical similarity of candidate corrections such as those generated by candidate generation module 230. Examples of the one or more appropriate translation models include edit distance and fuzzy match. The edit distance model feature function can be based on Levenshtein or another suitable edit distance algorithm. FIG. 6, discussed below, illustrates example pseudo code for calculating edit distance.

SpEQ can compute a modified edit distance of each token of the candidate Q and the corresponding token of $Q_r$, transform the edit distances into a score in the range [0 . . . 1] and take the average of these scores. The modified edit distance score gives different weights to different character edits based on the physical distance between the two characters on the input device, such as a physical keyboard, a soft keyboard, a touchscreen, etc. The edit distance model feature function can be based on a fuzzy match or another suitable hash-based algorithm that can work well on name tokens. SpEQ can compute a fuzzy similarity score of each token of the candidate Q with the corresponding token of $Q_r$, and take the average of these scores.

Block 226 can represent a content-based features module with logic to program processing unit 202 for scoring the content of candidate corrections such as those generated by candidate generation module 230. SpEQ can use content based features to increase the rank of candidates that have a higher chance of being used by the user as a search query based on where the candidate occurs in the content of the user's email data. Typically, subject lines contain important terms and email users tend to remember such terms from subject lines and use them in queries which contain tokens appearing in email subject lines. Similarly contact tokens are frequently used in email search and likely to be misspelled. SpEQ extracts content-based features such as multiple series of tokens from email subject lines, contacts, email body, and in some instances attachments, including metadata associated with the attachments. The series of tokens can be termed key phrases from the emails. The SpEQ algorithm can treat 2-4 token key phrases beginning and ending with some predefined part-of-speech (POS) tags as candidates and scores the key phrases based on their frequency of occurrence in a large text corpus. For this purpose SpEQ can store a dictionary of frequent tokens, frequencies and their most probable POS tags. This dictionary can be easily replaced or supplemented to operate with other languages as needed.

Often user queries are made up of one or more sub phrases containing closely related tokens, an aspect which is not captured fully by a bigram language model learnt on small user data. Accordingly, SpEQ employs four feature functions, which can be evaluated on mails such as those the candidate will fetch as a result when they are used as a query.

Examples of the one or more appropriate content-based features that content-based features module 226 can employ include those termed subject cover, subject match, key phrase cover, contact match, and too many emails. In SpEQ subject cover represents the portion or fraction of mails containing at least one candidate token in the subject line. In SpEQ subject match represents a maximum of a portion or fraction of candidate tokens appearing in any single subject line in the email data. In SpEQ key phrase cover represents a score of the maximum set covering the maximum number of candidate tokens contained in key phrases. SpEQ can score the set by the sum of Jaccard similarity coefficients of key phrases in the candidate, and in some instances by counting a candidate token once if covered by many key phrases in the cover. In SpEQ contact match represents a portion or fraction of candidate tokens that are present in at least one user's contacts. User's contacts as described herein can include entities and/or distribution names such as those represented in email fields "To," "From," courtesy copy ("Cc"), and/or blind courtesy copy ("Bcc"). In SpEQ too many emails represents a Boolean function to evaluate whether the candidate returns a number of emails above a user definable or pre-defined threshold. If so the candidate is unlikely to be useful to the user, and may be discarded.

The frequency with which a user interacts with any contact and recent changes in a user's mailbox can shape the search context of the user. SpEQ can employ contextual features to capture this user behavior. Examples of one or more appropriate contextual features that can be employed by contextual features module 228 include those termed recent subject match, recent contact match, frequent contact match, and device match. In SpEQ, recent subject match can represent a maximum of a portion or fraction of candidate tokens appearing in any single subject line in the email data in a time window of recent emails. In SpEQ, recent contact match can represent a portion or fraction of candidate tokens that are present in at least one user's contact in a time window of recent contact interactions. In SpEQ, frequent contact match can represent a portion or fraction of candidate tokens that are present more than a certain number of times in user's email data in a time window of recent contact interactions and/or more than a certain number of times in a user's email data, which may be designated by subdivision or folder. In SpEQ, device match can represent a portion or fraction of candidate tokens that are present with an indication of input from a particular input type, device type, and/or a particular device.

Figure 3:
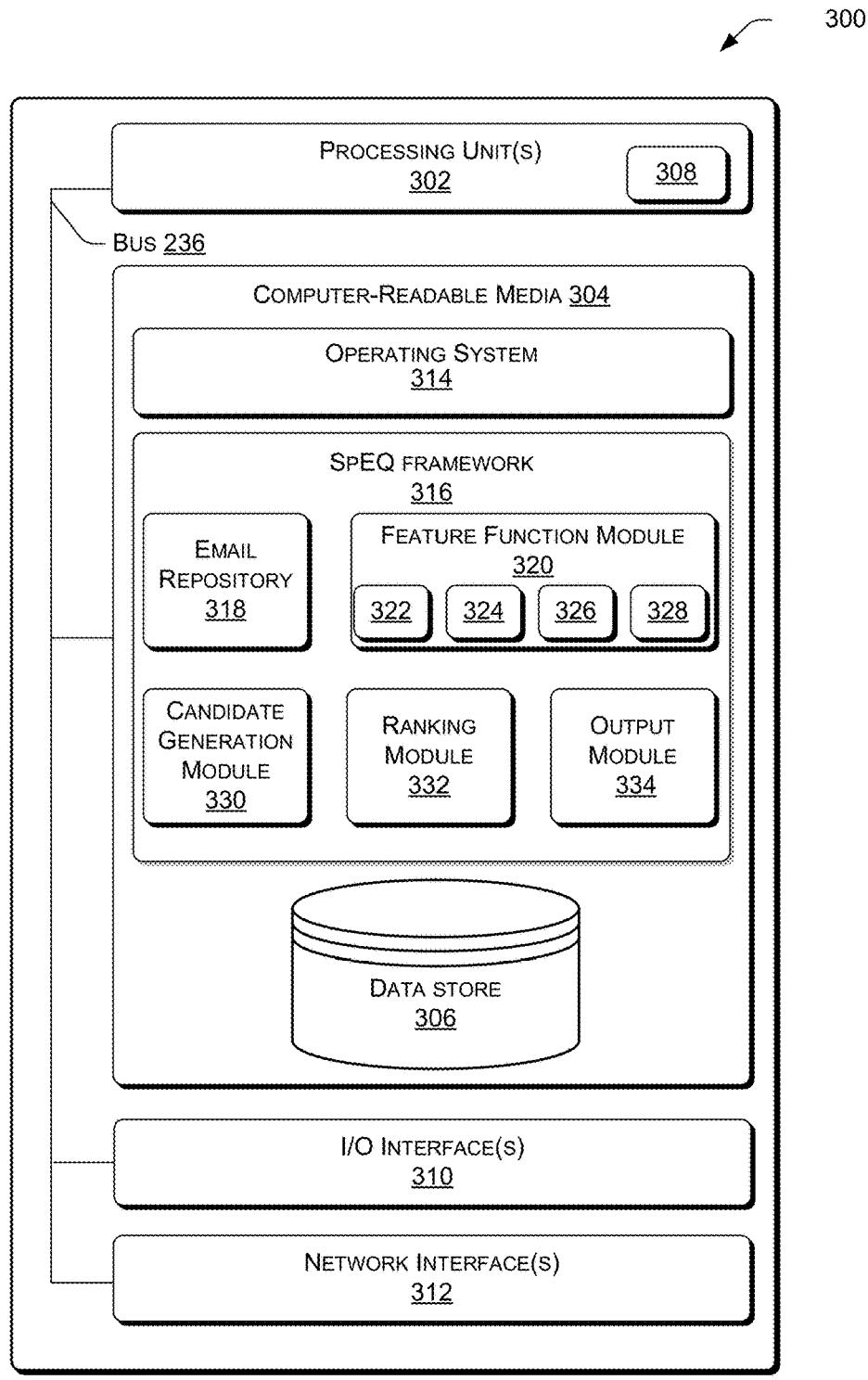
FIG. 3 is a block diagram depicting an example client computing device.

FIG. 3 is a block diagram depicting an example client computing device 300, such as a client device 120 from FIG. 1. In device(s) 300, processing unit(s) 302 can be processing unit(s) 124 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, computer-readable media 304 can be computer-readable media 126 and can store instructions executable by the processing unit(s) 302, which as discussed above, can represent a processing unit incorporated in device 300. Computer-readable media 304 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 300, while in some examples one or more of a CPU, GPU, and/or accelerator is external to device 300.

In the illustrated example, computer-readable media 304 also includes a data store 306. In some examples, data store 306 includes data storage such as a database, data warehouse, or other type of structured or unstructured data storage. In some examples, data store 306 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 306 can store data for the operations of processes, applications, components, and/or modules stored in computer-readable media 304 and/or executed by processing unit(s) and/or accelerator(s) 302. Alternately, some or all of the above-referenced data can be stored on separate memories on board one or more processing unit(s) 302 such as a memory 308 on board a CPU-type processor, a GPU-type processor, an FPGA-type accelerator, a DSP-type accelerator, and/or another accelerator.

Device(s) 300 can further include one or more input/output (I/O) interfaces 310 to allow device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 300, network interface(s) 312, which can be network interface(s) 132, can represent, for example, network interface controllers (NICs) or other types of transceiver devices to send and receive communications over a network.

In the illustrated example, computer-readable media 304 also includes an operating system 314, which can be operating system 130. Computer-readable media 304 also includes a SpEQ framework 316, which can be SpEQ framework 132. SpEQ framework 316 can include one or more modules and/or APIs, which are illustrated as blocks 318, 320, 322, 324, 326, 328, 330, 332, and 334, although this is just an example, and the number can vary higher or lower.

Functionality described associated with blocks 318, 320, 322, 324, 326, 328, 330, 332, and 334 can be combined to be performed by a fewer number of modules and/or APIs or it can be split and performed by a larger number of modules and/or APIs. For example, block 318 can represent an email repository module with logic to program processing unit 302 of device 300 for extraction of one or more emails, such as emails from an email repository stored in data store 306 or an external data store. In some examples, the email repository module 318 further includes logic to distinguish between emails associated with various client devices 120 and/or various entities, for example, entities 122A and 122B, and/or constituents of various entities, for example designees, users, etc.

User queries generally include one or more sub phrases containing closely related tokens, an aspect which is not captured fully by a language model learnt on small data such as email data from a single user. Based on this insight, SpEQ can define or determine a number of feature functions. For example, SpEQ can define or determine four feature functions, which are evaluated on the email data from which the candidate will be returned as a result when the feature functions are used in a query. Block 320 can represent a feature function module with logic to program processing unit 302 for identifying features in email data, such as email data from an email repository stored in data store 306 and/or as extracted by email repository module 318. Feature function module 320 can include logic for one or more feature functions $\Phi$, such as for a language model module 322, a translation model module 324, a content-based feature module 326, and a contextual feature module 328 to identify certain features in email data. More particularly, for an input query $Q_t$, the feature functions $\{\Phi_j\}$ 322, 324, 326, and 328 can score the candidate based on the particular context or lexical cue which is being measured. The feature functions SpEQ employs are computationally efficient and can be computed for any query, entity, user, language and/or domain. SpEQ can categorize the feature functions measuring lexical similarity in translation model features by trans-lation model module 324, the context from the query in language model features by language model module 322, the context from the user email data in content based features by content-based feature module 326, and the search context in contextual features by contextual feature module 328.

Block 330 can represent a candidate generation module with logic to program processing unit 302 for generating candidate corrections corresponding to a given query. Unlike web search, where query logs are available, candidate corrections generated by candidate correction module 330 come from the user data rather than from leveraging rewritten queries which resulted in a click for the original misspelled query as in web search. Instead, candidate correction module 330 can leverage features identified in the user's email data. For example, if a candidate doesn't fetch any mail results, the candidate can be omitted from the process of ranking.

Block 332 can represent a ranking module with logic to program processing unit 302 for ranking candidate corrections to provide personalized and context sensitive corrections on users email data In various examples block 332 represents logic for computing a weighted score for each of the language model 322, the translation model 324, the content-based features 326, and the contextual features 328 identified by feature function module 320. In at least one example, the sum of these weighted scores provides a final score for ranking the respective candidate corrections.

Block 334 can represent an output module with logic to program processing unit 302 of device 300 for to cause presentation of the candidate corrections and matching email to the appropriate input/output interface 310 and/or network interface 312.

Bus 336, which can be bus 126 and which in some instances, can include one or more of a system bus, a data bus, an address bus, a PCI bus, a Mini-PCI bus, and any variety of local, peripheral, and/or independent buses, can operably connect computer-readable media 304 to processing unit(s) 302.

Block 322 can represent a language model module with logic to program processing unit 302 for scoring candidate corrections such as those generated by candidate generation module 330. Examples of the one or more appropriate language models include a bigram language model and a normalized token inverse document frequency (IDF) model. The bigram language model feature function can score the candidate correction using a bigram language model computed from the user's email data. SpEQ can use a sliding window for computing the bigram counts. Further, SpEQ can discount the raw bigram counts using any appropriate discounting technique such as Kneser-Ney discounting. The normalized token IDF feature function can score the candidates according to an average of inverse document frequency normalized with a maximum value.

Block 324 can represent a translation model module with logic to program processing unit 302 for scoring lexical similarity of candidate corrections such as those generated by candidate generation module 330. Examples of the one or more appropriate translation models include edit distance and fuzzy match. The edit distance model feature function can be based on Levenshtein or another suitable edit distance algorithm. SpEQ can compute a modified edit distance of each token of the candidate Q and the corresponding token of $Q_t$, transform the edit distances into a score in the range [0 . . . 1] and take the average of these scores. The modified edit distance score gives different weights to different character edits based on the physical distance between the two characters on the input device, such as a physical keyboard, a soft keyboard, a touchscreen, etc. The edit distance model feature function can be based on a fuzzy match or another suitable hash-based algorithm that can work well on name tokens. SpEQ can compute a fuzzy similarity score of each token of the candidate Q with the corresponding token of $Q_t$, and take the average of these scores.

Block 326 can represent a content-based features module with logic to program processing unit 302 for scoring the content of candidate corrections such as those generated by candidate generation module 330. SpEQ can use content based features to increase the rank of candidates that have a higher chance of being used by the user as a search query based on where the candidate occurs in the content of the user's email data. Typically, subject lines contain important terms and email users tend to remember such terms from subject lines and use them in queries which contain tokens appearing in email subject lines. Similarly contact tokens are frequently used in email search and likely to be misspelled. SpEQ extracts content-based features such as multiple series of tokens from email subject lines, contacts, email body, and in some instances attachments, including metadata associated with the attachments. The series of tokens can be termed key phrases from the emails. The SpEQ algorithm treats 2-4 token key phrases beginning and ending with some predefined part-of-speech (POS) tags as candidates and scores the key phrases based on their frequency of occurrence in a large text corpus. For this purpose SpEQ stores a dictionary of frequent tokens, frequencies and their most probable POS tags. This dictionary can be easily replaced or supplemented to operate with other languages as needed.

Examples of the one or more appropriate content-based features that can be employed by content-based features module 326 include those termed subject cover, subject match, key phrase cover, contact match, and too many emails. In SpEQ subject cover represents the portion or fraction of mails containing at least one candidate token in the subject line. In SpEQ subject match represents a maximum of a portion or fraction of candidate tokens appearing in any single subject line in the email data. In SpEQ key phrase cover represents a score of the maximum set covering the maximum number of candidate tokens contained in key phrases. SpEQ can score the set by the sum of Jaccard similarity coefficients of key phrases in the candidate, and in some instances by counting a candidate token once if covered by many key phrases in the cover. In SpEQ contact match represents a portion or fraction of candidate tokens that are present in at least one user's contacts. User's contacts as described herein can include entities and/or distribution names such as those represented in email fields "To," "From," courtesy copy ("Cc"), and/or blind courtesy copy ("Bcc"). In SpEQ too many emails represents a Boolean function to evaluate whether the candidate returns a number of emails above a user definable or pre-defined threshold. If so the candidate is unlikely to be useful to the user, and may be discarded.

Examples of one or more appropriate contextual features that can be employed by contextual features module 328 include those termed recent subject match, recent contact match, frequent contact match and device match. In SpEQ, recent subject match can represent a maximum of a portion or fraction of candidate tokens appearing in any single subject line in the email data in a time window of recent emails. In SpEQ, recent contact match can represent a portion or fraction of candidate tokens that are present in at least one user's contact in a time window of recent contact interactions. In SpEQ, frequent contact match can represent a portion or fraction of candidate tokens that are present more than a certain number of times in user's email data in a time window of recent contact interactions and/or more than a certain number of times in a user's email data, which may be designated by subdivision or folder. In SpEQ, device match can represent a portion or fraction of candidate tokens that are present with an indication of input from a particular input type, device type, and/or a particular device.

In some examples, one or more of the modules and logic associated with device 200 may operate on device 300 and/or one or more of the modules and logic associated with device 300 may operate on device 200. The modules and logic can be stored on, operated from, or installed from computer-readable media associated with device 200 and/or device 300.

Computer-readable media may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 110, 204, 126, and/or 304 can be examples of computer storage media similar to memories 208 and/or 308. Thus, the computer-readable media 110, 204, 126, and/or 304 and/or memories 208 and 308 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 4:
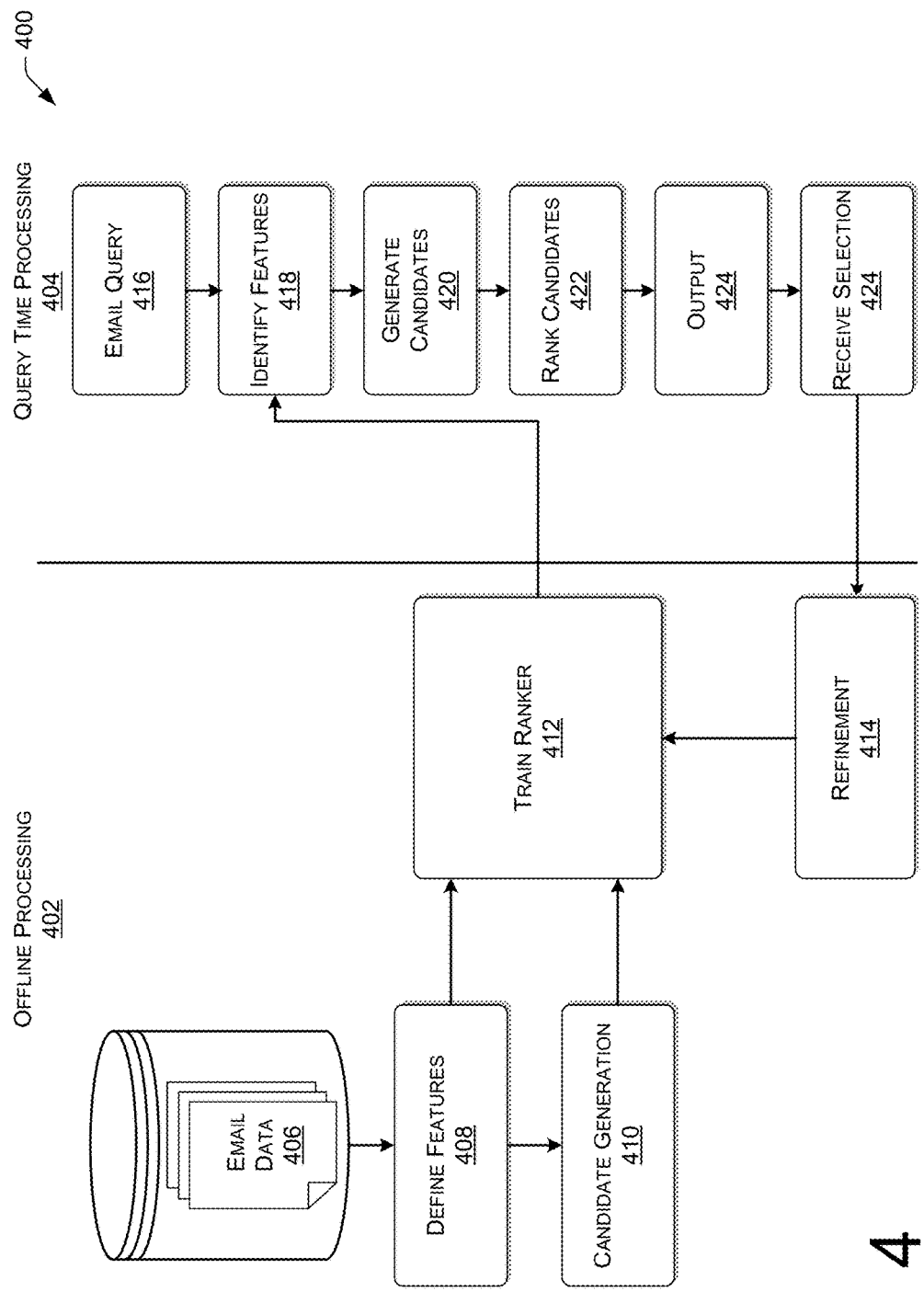
FIG. 4 is a block diagram depicting an example process architecture that can perform spelling correction of email queries (SpEQ) as described herein.

FIG. 4 is a block diagram depicting an example architecture of processes that SpEQ framework 216 and/or SpEQ framework 316 can perform to facilitate spelling correction of email search queries as described herein. The architecture 400 includes an offline processing portion 402 and a query-time processing portion 404. In some examples SpEQ framework 116 of device(s) 106 and/or SpEQ framework 216 of device(s) 200 can perform offline processing portion 402 and SpEQ framework 130 of device(s) 120 and/or SpEQ framework 316 of device(s) 300 can perform query time processing 404. Although in some examples, SpEQ framework 132 or devices 120 and/or SpEQ framework 316 or devices 300 can perform one of more aspects of the offline processing portion 402.

Offline processing portion 402 includes operations on email data 406. In experiments, email data 406 included public email data. Generally email data is private to the entities and/or users to whom the email accounts belong. SpEQ provides users the option to train the process using their own email data without making that email data publicly available. Entities and users may want to train and/or retrain using their email data to improve the efficiency and accuracy of searching in email. In various examples, offline processing portion 402 can work with publicly available email data and/or entity/user email data.

In examples of web-based email, e.g., OUTLOOK WEB ACCESS (OWA), YAHOO email, GMAIL, etc., offline processing portion 402 can be performed on devices 106 in a cloud configuration, or partly on device(s) 106 and device(s) 120. In non-web-based email systems, such as enterprise or other locally hosted email systems, offline processing portion 402 can be performed on device(s) 106 as central serves due to generally increased processing power, partly on device(s) 106 and devices 120, and/or on devices 120 independent of device(s) 106. Performance of offline processing portion 402 on devices 120 independent of device(s) 106 can represent one implementation for receiving an indication that the user is not willing to share the user's email search queries.

From the email data 406 available for training, offline processing portion 402 can define or determine features in the email data 408, generate candidates 410, and train a ranker 412. After receiving one or more email queries, provided the entity or user has opted to share the email queries to improve their email searching experience, offline processing portion 402 can refine the training of the ranker 414. For example, SpEQ can use contextual features of actual email search queries of the user to retrain the ranker, which will result in personalizing the ranker for optimum results on the particular user's email.

Query time processing 404 includes receiving an email query 416. For example, device 120 may receive an email query from a user and in some instances may pass the email query to device 106. Thus, device 106 and/or device 120 can receive email query 416. Query time processing 404 identifies features in the email query 418, and generates candidates for corrections to match the identified features 420. Query time processing 404 ranks candidates 422.

In examples of web-based email, e.g., OUTLOOK WEB ACCESS (OWA), YAHOO email, GMAIL, etc., query time processing portion 404 can be performed on devices 106 in a cloud configuration, or partly on device(s) 106 and device(s) 120. In non-web-based email systems, such as enterprise or other locally hosted email systems, query time processing portion 404 can be performed on device(s) 106 as central serves due to generally increased processing power, partly on device(s) 106 and devices 120, and/or on devices 120 independent of device(s) 106. Performance of query time processing portion 404 on devices 120 independent of device(s) 106 can represent one implementation for receiving an indication that the user is not willing to share the user's email search queries. From the ranked candidate corrections, query time processing 404 can cause one or more candidate corrections to be output for the email search query 424. In instances where users have indicated a desire to share their email data, query time processing 404 can include providing the candidate corrections selected 426 from the output 424 to retrain the ranker 414.

Figure 5:
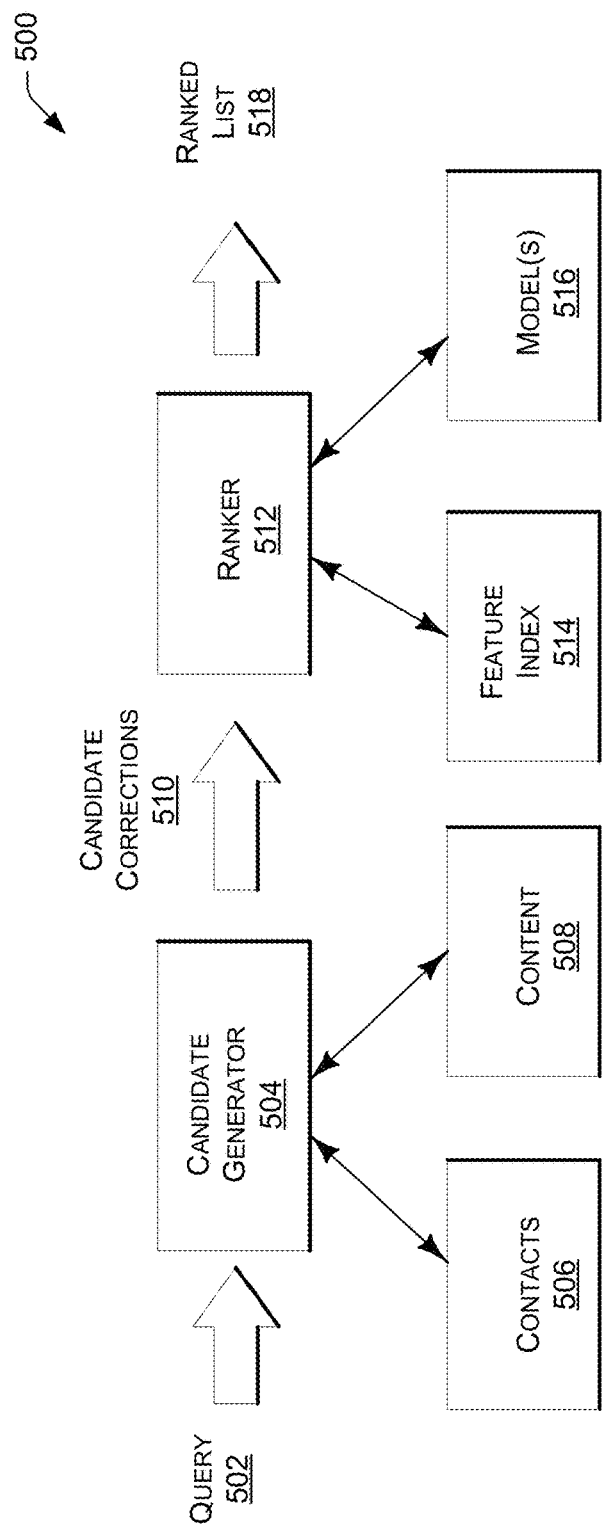
FIG. 5 is a diagram showing an example approach for query processing in spelling correction of email queries as described herein.

FIG. 5 is a diagram showing an example approach for query processing 500 in spelling correction of email queries as described herein. In query processing 500, SpEQ receives an email query input 502, $Q_t$ at a candidate generator 504, g. Candidate generator 504 accesses contacts 506 and content 508 associated with an entity, e.g., from an email account of the entity. For example, contacts can include entities and/or distribution names such as those represented in email fields "To," "From," courtesy copy ("Cc"), and/or blind courtesy copy ("Bcc") of emails in the entity email account, and content can include email text, metadata associated with an email, email attachments, and metadata associated with email attachments. From the contacts 506 and content 508, candidate generator 504 identifies candidate corrections 510, g ($Q_t$; C) and passes the candidate corrections to ranker 512, $\{\Phi_i\}$.

The task of a spelling correction algorithm is to recover the correct $Q_c$, given the input $Q_t$ and the context available from the user's email account C.

$$Q_c = \underset{Q}{\mathrm{argmax}}\, P(Q \mid Q_t, C) \qquad \text{Equation (1)}$$

Ranker 512 can process the candidate corrections 510 by accessing a feature index 514 and applying models 516 according to Equation 2. If $\mathcal{T}$ is the current information need of a user, and a query Q can be obtained by a lexical mutation function $f$ as Q=$f$ ($Q_t$), then the correct query $Q_c$ is the one which returns mail results (E) most similar to $\mathcal{T}$. An application of Bayes' theorem to Equation 1 gives the following:

$$Q_c = \underset{Q}{\mathrm{argmax}}\, \log P(Q \mid C) + \log P(Q_t \mid Q, C) \qquad \text{Equation (2)}$$

In Equation 2, P(Q|C), the language model, represents the probability that the user has Q in mind when the search context is C. P($Q_t$|Q,C), the translation model, represents the probability that a user would type $Q_t$ while intending to type Q in the search context of C. SpEQ can extend the probabilistic framework into a ranking framework by treating the language and translation models as feature functions. A ranking framework gives SpEQ more flexibility to add more feature functions and can scale different feature functions differently with the help of the training data.

For example, let $\Phi_i$ be the ith feature function and $w_i$, its weight. In the ranking framework, the spelling correction algorithm employs candidate corrections g($Q_t$; C) from a candidate generator g, e.g., candidate generation 410 which can represent candidate generation module 230 and/or candidate generation module 330, evaluates the feature functions $\Phi_i$, i=1, . . . , m, on each candidate correction Q, computes the score $\Sigma_{i=1}^{m} = w_i \Phi_i(Q; Q_t, C)$ and returns a ranked list or ranked subset of the candidate corrections ordered by their score:

$$Q_c = \underset{Q \in g(Q_t; C)}{\arg\max} \sum_{i=1}^{m} w_i \Phi_i(Q; Q_t, C) \qquad \text{Equation (3)}$$

SpEQ can employ a ranking framework as presented in Equation 3 having a candidate generator g and/or feature functions $\{\Phi_i\}$ to obtain a ranked list 518 corresponding to email search query 502.

FIG. 6 is a listing of example pseudo code representing an algorithm for computing edit distance as described herein. In various examples, the edit distance computations can differ according to device type and/or input type, for example. For example, the edit distance computations can be based on "equal-weight" edit distance and/or "fat-finger" edit distance.

In "equal-weight" edit distance the character substituted, deleted, swapped or inserted is weighed equally according to the keyboard configuration being employed. Mistakes on a hard keyboard such as associated with laptop or desktop computer are less likely than on a cell phone or tablet due to finger placement, and hence the edit distance computations can be based on an equal weight edit distance function in which character substitutions, deletions, swaps and insertions are weighed equally for such a hardware keyboard.

In "fat-finger" edit distance the character substituted, deleted, swapped or inserted is weighed according to the neighboring character. For instance, on a cell phone for a qwerty keyboard, the letter 'a' is more likely to be mistyped as the letter 's' rather than the letter 'k' due to the user's finger falling partially on the letter 's' instead of the letter 'a'. Mistakes on a soft keyboard such as a touch screen for a cell phone or tablet are more likely due to finger placement, and hence the edit distance computations can be based on an fat finger function in which character substitutions, deletions, swaps and insertions are weighed according to the neighboring character for such a soft keyboard.

In various examples, differing keyboard layouts, such as a Dvorak keyboard compared to a qwerty keyboard, can employ different character weights. The weights can also be different for different screen sizes of touch screen devices. For example, small screens may be more prone to input errors than larger screens. Thus edit distance computation can differ according to device type and/or input type.

Figure 7:
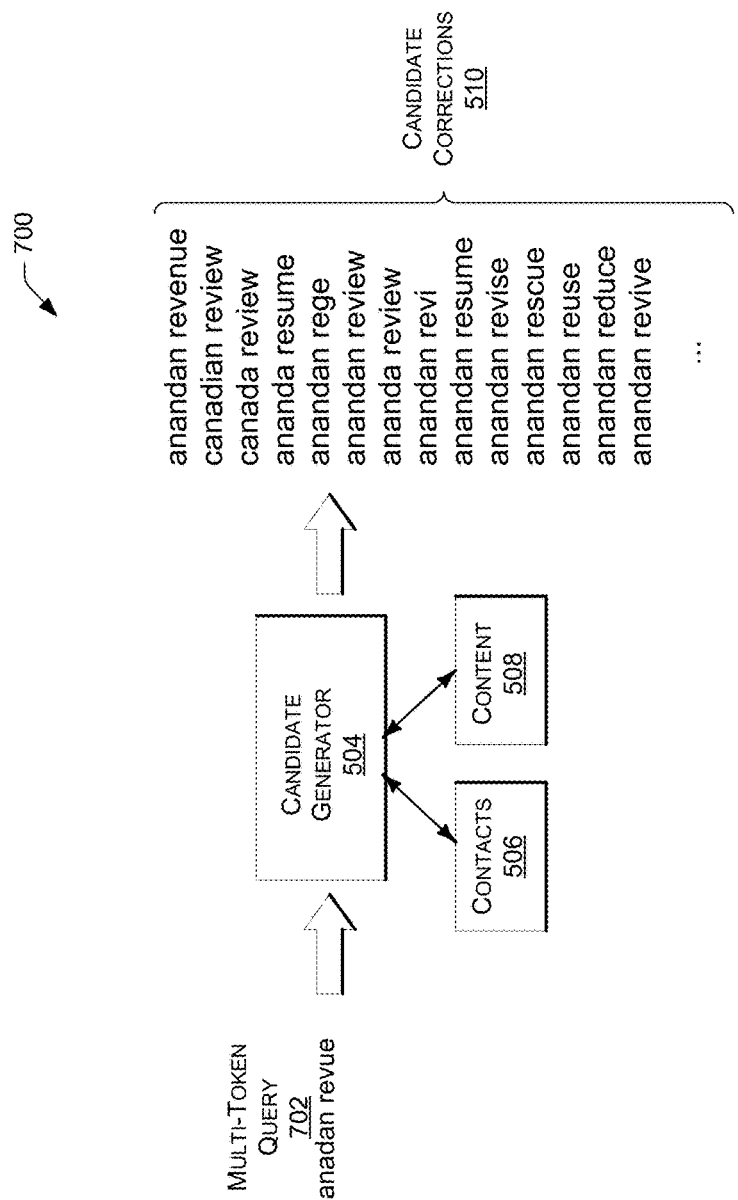
FIG. 7 is a diagram showing an example approach for candidate generation in spelling correction of email queries as described herein.

FIG. 7 is a diagram showing an example approach for candidate generation 700 in spelling correction of email queries as described herein. Given a query $Q_t$, in this example a multi-token query "anadan revue" 702, which can represent query 502, as input, the candidate generator g 504 based on contacts 506 and content 508 as discussed regarding FIG. 5, generates a set of candidate corrections 510 which has a high probability of containing the desired correction $Q_c$. Candidate generator 504 can form candidates for such a multi-token query by combining candidates of individual tokens, scoring the combination by IDF and edit distance, and outputting the top N combinations as the set of candidate corrections 510. When query logs are available, for instance in Web Search, candidate corrections for $Q_t$ can be generated by leveraging rewritten queries which resulted in a click for the original misspelled query. Since SpEQ does not assume the availability of such query logs, the approach of leveraging rewritten queries which resulted in a click for the original misspelled query and other related approaches are not feasible.

In SpEQ candidates come from the user's data. Tokens in the corrected query should lie within a given edit distance threshold, e.g., three edits, to the corresponding input tokens in the same order. Each naive combination of such tokens within the given threshold can be regarded to be a potential candidate. However, this can easily lead to a combinatorial explosion with as few as two tokens. To remedy this, SpEQ can use a dynamic programming algorithm to retain a fixed number of top scoring candidates, e.g., 1000, using a scoring function such as Equation 4. Given the misspelled query $Q_t = q_1 q_2 \ldots q_n$ with n tokens and a candidate $Q = q_1^c q_2^c \ldots q_m^c$ with m tokens, $$\text{qualifying\_score}(Q) = \sum_{i=1}^{m} \left( \frac{idf(q_i^c)}{\log|C|} + \delta_{iscontact}(q_i^c) - \min_{j=1\ldots n} \frac{EditDistance(q_i^c, q_j)}{\max(\text{length}(q_i^c), (\text{length}(q_j)))} \right)$$

Equation (4)

For many query and candidate pairs, EditDistance($q_i^c$, $q_j$) can be greater than the threshold c. In various examples, SpEQ can ignore those terms for all ($q_i^c$, $q_j$) pairs except one, which makes the use of a dynamic programming algorithm possible. In SpEQ the edit distance and IDF of each token can be normalized with the maximum value particular to the token. $\delta_{iscontact}$(q)=1 if q is a contact token else 0. SpEQ can retain such candidates whose tokens all co-occur in at least one target email. Experiments found an average 130 candidates per query, of which, after taking the top 1000 candidates, an average 96 candidates per query were retained.

Figure 8:
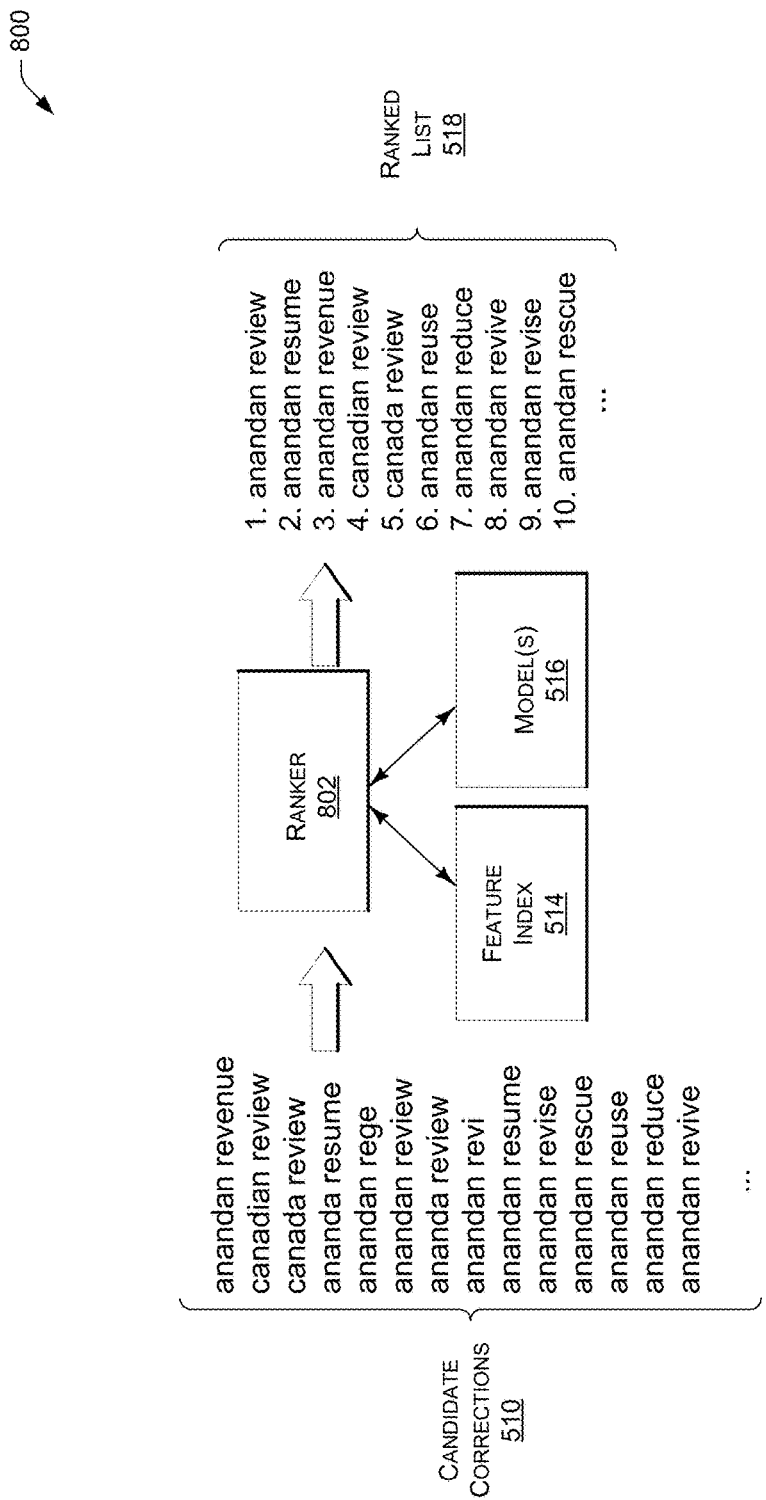
FIG. 8 is a diagram showing an example approach for ranking candidates in spelling correction of email queries as described herein.

FIG. 8 is a diagram showing an example approach for ranking candidates 800 in spelling correction of email queries as described herein. Given set of candidate corrections 510 which has a high probability of containing the desired correction $Q_c$, in this example for particular query $Q_t$, the multi-token query "anadan revue," as input, the ranker g 802, which can represent ranker $\{\Phi_i\}$ 512, can rank candidates using a weighted sum of feature their feature values obtained via machine learning a feature index 514 and applying models 516 as discussed regarding FIG. 5.

Feature index 514 can identify certain features in email data for ranker 802. Feature index 514 can represent or be associated with a feature function module as mentioned earlier with regard to blocks 220 and/or 320. Models 516 can identify certain features in email data for ranker 802 by applying models such as a language model and a translation model. In SpEQ such models can be treated as features. Thus, models 516 can represent or be associated with a feature function module as mentioned earlier with regard to blocks 220 and/or 320. Such a feature function module can include logic for one or more feature functions Φ, such as for a language model module 222 and/or 322, a translation model module 224 and/or 324, a content-based feature module 226 and/or 326, and a contextual feature module 228 and/or 328 to identify certain features in email data. More particularly, for an input query $Q_t$ the feature functions $\{\Phi_i\}$ 222, 224, 226, 228, 322, 324, 326, and/or 328 can score the candidate corrections based on the particular context or lexical cue which is being measured. The feature functions SpEQ employs are computationally efficient and can be computed for any query, user, language and/or domain. SpEQ can categorize the feature functions measuring lexical similarity in translation model features by translation model module 224 and/or 324, the context from the query in language model features by language model module 222 and/or 322, the context from the user email data in content based features by content-based feature module 226 and/or 326, and the search context in contextual features by contextual feature module 228 and/or 328. SpEQ can compute a weighted score for each of the feature functions, the sum of which can be employed as the score for a candidate.

Models 516 can include a language model 222, which can score the candidate using a bigram language model $\Sigma_i \log P(q_i|q_{i-1})$ computed from the user's emails. SpEQ can use a sliding window, for example of size 5, for computing the bigram counts, using a decreasing count to reflect distance from adjacency of the token. For example, SpEQ can use a count of 5 for the adjacent token, 4 for the token at a distance two, and so on. Further, SpEQ can discount the raw bigram counts using any appropriate discounting technique such as Kneser-Ney discounting.

Models 516 can include a language model 222, which can score the candidate using a normalized token IDF: The normalized token IDF feature function can score the candidates according to an average of inverse document frequency (IDF) normalized with a maximum value.

Models 516 can include a translation model 224. SpEQ can define or determine feature functions to measure lexical similarity. For example, a translation model of SpEQ can define or determine feature functions based on Levenshtein edit distance and/or based on fuzzy similarity to measure lexical similarity. SpEQ can compute a modified Levenshtein edit distance of each token of the candidate Q and the corresponding token of $Q_t$, transform the edit distances into a score in the range [0 . . . 1], and take the average of these scores. The modified edit distance score can give different weights to different character edits based on the physical distance on an input device, such as a keyboard, between the two characters.

SpEQ can compute a fuzzy match. As $Q_t$ can contain name tokens (e.g. noarvig in the query "noarvig flies"), SpEQ can employ a fuzzy similarity score, for example, on name tokens. SpEQ can compute the fuzzy similarity score of each token of the candidate Q with the corresponding token of $Q_t$ and take the average of these scores.

Feature index 514 can include content based features such as those identified by feature module 226 and/or 326. Ranker 802 of SpEQ can use content based features to increase the rank of candidates that have a higher chance of being used by the user as a search query based on where the candidate occurs in the content of the user's email data. Typically, subject lines contain important terms and email users tend to remember such terms from subject lines and use them in queries which contain tokens appearing in email subject lines. Similarly contact tokens are frequently used in email search and likely to be misspelled. SpEQ extracts content-based features such as multiple series of tokens from email subject lines, contacts, email body, and in some instances attachments, including metadata associated with the attachments. The series of tokens can be termed key phrases from the emails. The SpEQ algorithm treats 2-4 token key phrases beginning and ending with some predefined part-of-speech (POS) tags as candidates and scores the key phrases based on their frequency of occurrence in a large text corpus. For this purpose SpEQ stores a dictionary of frequent tokens, frequencies and their most probable POS tags. This dictionary can be easily replaced or supplemented to operate with other languages as needed. Typically user queries consist of one or more sub phrases containing closely related tokens, an aspect which is not captured fully by a language model learnt on small data such as email data from a single user. Based on this insight, SpEQ can define or determine a number of feature functions. For example, feature index 514 can define or determine four feature functions, which are evaluated on the email data from which the candidate will be returned as a result when the feature functions are used in a query.

Examples of the one or more appropriate content-based features that can be employed by content-based features module 226 and/or 326 include those termed subject cover, subject match, key phrase cover, contact match, and too many emails. In SpEQ subject cover represents the portion or fraction of mails containing at least one candidate token in the subject line. In SpEQ subject match represents a maximum of a portion or fraction of candidate tokens appearing in any single subject line in the email data. In SpEQ key phrase cover represents a score of the maximal set cover of candidate tokens using key phrases. SpEQ can score the set by the sum of Jaccard similarity coefficients of key phrases in the candidate, and in some instances counting a candidate token once if covered by many key phrases in the cover. In SpEQ contact match represents a portion or fraction of candidate tokens that are present in at least one user's contact. User's contacts as described herein can include entities and/or distribution names such as those represented in email "To," "From," courtesy copy ("Cc"), and/or blind courtesy copy ("Bcc"). In SpEQ too many emails represents a Boolean function to evaluate whether the candidate returns a number of emails above a user definable or pre-defined threshold. If so the candidate is unlikely to be useful to the user, and may be discarded.

Feature index 514 can include context-based features such as those identified by feature module 228 and/or 328. Ranker 802 of SpEQ can use context-based features to increase the rank of candidates that have a higher chance of being used by the user as a search query based on context of the candidate relative to the user's email data. For example, the frequency with which a user interacts via a particular type of device and/or via a particular device, with any contact and the recent changes in the email account can significantly shape the search context of the user. SpEQ contextual feature functions aim to capture this user behavior.

Examples of one or more appropriate contextual features that can be employed by contextual features module 228 and/or 328 include those termed recent subject match, recent contact match, as well as frequent contact match and device match. In SpEQ, recent subject match can represent a maximum of a portion or fraction of candidate tokens appearing in any single subject line in the email data in a time window of recent emails. In SpEQ, recent contact match can represent a portion or fraction of candidate tokens that are present in at least one user's contact in a time window of recent contact interactions. User's contacts as described herein can include entities and/or distribution names such as those represented in email "To," "From," courtesy copy ("Cc"), and/or blind courtesy copy ("Bcc"). In SpEQ, frequent contact match can represent a portion or fraction of candidate tokens that are present more than a certain number of times in user's email data in a time window of recent contact interactions and/or more than a certain number of times in a user's email data, which may be designated by subdivision or folder. In SpEQ, device match can represent a portion or fraction of candidate tokens that are present with an indication of input from a particular input type, device type, and/or a particular device. Thus, SpEQ can employ a ranker 802 to obtain a ranked list 518.

Figure 9:
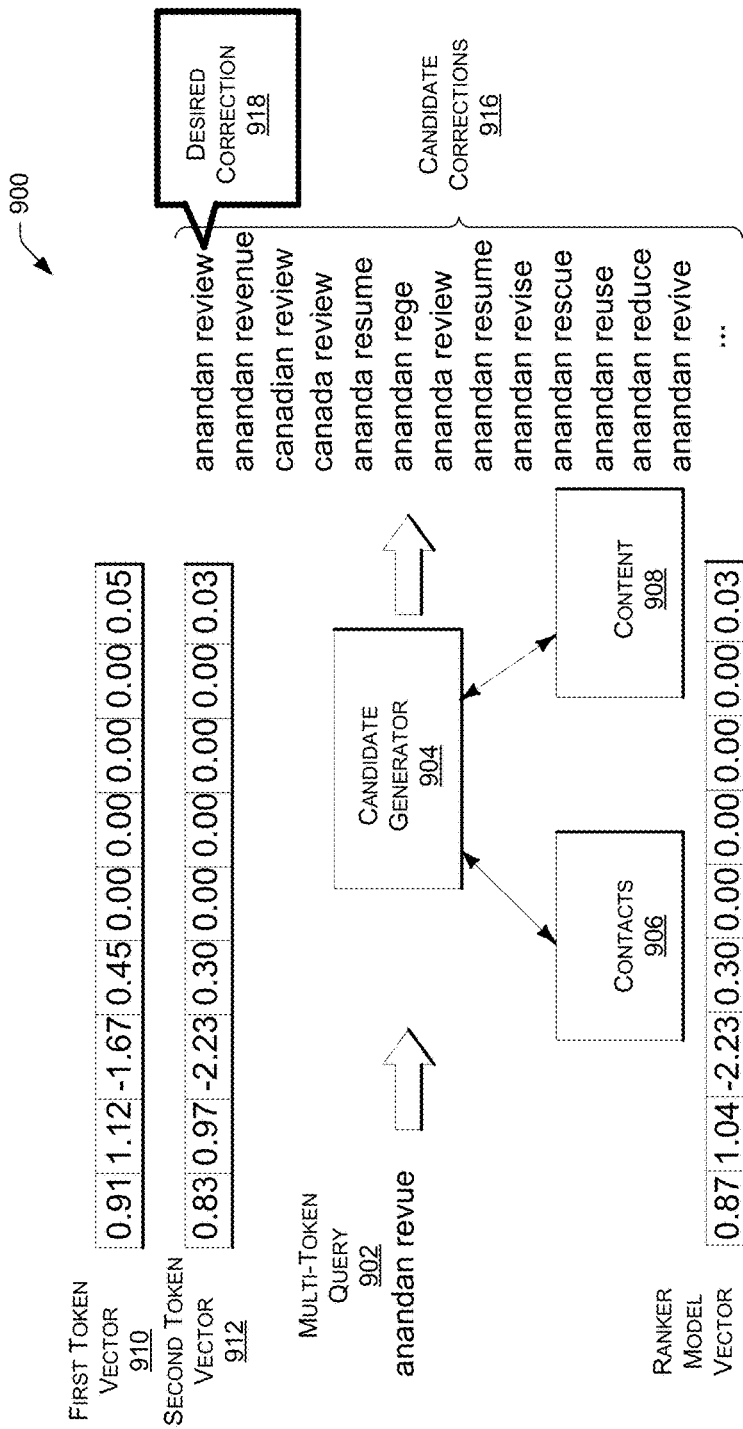
FIG. 9 is a diagram showing an example approach for training a ranker in spelling correction of email queries as described herein.

FIG. 9 is a diagram showing an example approach for training a ranker in spelling correction of email queries 900, which can correspond to the description to train a ranker 412 from offline processing portion 402. Such a ranker can include ranker 512, 802, and/or another type of ranker.

At 902 the ranker receives an example multi-token query for training. In offline processing 402 one or a number of computing devices use machine learning to learn a ranker model. The offline processing 402 can be performed independent of user initiation and in various instances be performed once or periodically. In offline processing 402, as illustrated at 406, one or a number of computing devices define or determine features, such as via feature function module 220 and/or 320, which SpEQ can generalize over email accounts of multiple domains and are efficient and practical to compute. Candidate generator 904, which can correspond to candidate generator 504 consistent with candidate generation 410 can identify candidate corrections from the contacts 906 and content 908, which can represent 506 and content 508.

Candidate generator 904 can obtain weights for the features of individual tokens of the multi-token query, for example token first token vector 910 and second token vector 912 by training on sample offline training data and summing the feature vectors to obtain a ranker model vector 914. The resulting model can be used to provide candidate corrections 916 on any user's email account. Of the candidate corrections 916, SpEQ can present the candidate correction corresponding to a matching query, termed the desired correction 918 at the beginning of the list of candidate corrections.

In some examples, computing device(s) 106 and/or 200, or in some instances computing device(s) 120 and/or 300, can train a ranker model by generating candidates and corresponding feature vectors, e.g., 910, 912, and 914 from publicly available or released email data. For example, SpEQ can train the ranker model based on sets of data such as a first set of email data from an inbox subdivision or folder for a first entity, a second set of email data from a sent mail subdivision or folder for the same entity, and a third set of email data from a subdivision or folder from a second entity.

For each query in the set, SpEQ can generate the candidates and their feature vectors, and assign the rank of two (2) to the candidate corresponding to a matching query and the rest of the candidates the rank of one (1). For training SpEQ can use a subset of the top scoring candidates, for example the top scoring ten (10) candidates generated by the candidate generation module 230 while for testing and implementation SpEQ can consider many more up to all or the top 1000 candidates. In some examples, SpEQ can use $SVM^{rank}$ or another suitable ranking algorithm to train the ranker with trade-off between error and margin "c" as 100 and loss function "l" as 2 which is portion or fraction of swapper pairs averaged over all queries of the $SVM^{rank}$ command line parameters. In various examples, the features, language model, content, context, etc. can include predetermined numerical functions of form $f(Q) \rightarrow R$. The predetermined numerical functions can take in the query and output a real number. In some examples SpEQ can use $SVM^{rank}$, or another machine learning algorithm such as a discriminative classifier or a probabilistic model, to learn weights to be assigned to individual of these functions such that the function produces an optimized ranking. The features functions are predetermined and the relative weights are determined by the machine learning algorithm using the training data. The training step need not be performed for each example and each user. Once trained over a sample training data, the model can be deployed. In at least one example, parameters used for training may vary in accordance with particular training algorithms and can be optimized on the training data. Those of skill in the art will recognize that selection of machine learning algorithm and the selection of parameters may vary without deviating from the description herein.

In an example SpEQ used two sets from one entity, totaling about 15,000 emails, and totaling about 2100 emails from a second entity for training a ranker model. Table 1 gives some statistics for queries on the test set.

TABLE 1

Statistics for queries in mail sets

| Test set | Total | Misspelled | Avg. Tokens | Avg. characters |
|---|---|---|---|---|
| First Entity-INBOX | 364 | 227 | 2.14 | 16.34 |
| First Entity -SENT | 309 | 184 | 2.04 | 15.26 |
| Second Entity | 106 | 106 | 1.95 | 14.62 |

Illustrative Results

SpEQ results compared to two baseline approaches, BSpEQ and GSpell. BSpeQ: is a trimmed down version of SpEQ using only the bigram language model and edit distance feature functions. Note that BSpeQ uses the same candidate generator as SpEQ and its ranker model is trained similar to that of SpEQ. GSpell is the spelling correction feature of GMAIL, which appears to be based on GOOGLE search results. GSpell was evaluated by importing contents of the First Entity inbox folder and sent mail folder to a GMAIL account.

Using a precision of 1 (P@1) as the metric for evaluation the performance of SpEQ as well as the baselines measured the portion or fraction of queries for which the spelling correction algorithm produced the desired correction at the highest rank, e.g., the correct $Q_c$. A first experiment included a 10-fold validation on the two first entity folders and all query sets combined with the feature vectors for each query being drawn from their respective folders. Table 2 compares the results of SpEQ with that of BSpEQ and GSpell from the experiment.

TABLE 2

Precision @1 in 10 fold cross validation on query sets

| Query set | BSpEQ | SpEQ | GSpell |
|---|---|---|---|
| First Entity-INBOX | 83 | 86.60 | 83.61 |
| First Entity -SENT | 79.25 | 90.15 | 84.72 |
| ALL | 81.11 | 89.34 | 84.88 |

The first experiment illustrated that SpEQ gives 10% improvement in P@1 over BSpEQ. This result justified the use of additional translation model, the content based and contextual features. Further, SpEQ gives 6:42% improvement in P@1 over GSpell. Since the details of GSpell are not known, it is not possible to attribute the improvement in performance to any class of features, but the combination of user data driven candidate generation and feature functions outperformed both of the baseline approaches.

The second experiment involved training the ranker on the union of the first entity inbox folder and the first entity sent mail folder and testing the resulting model on the second entity folder. As the test data is from a different domain than the training data, this experiment sought to determine how well the ranking model trained on mail data from one domain would generalize to mail data from a different domain. SpEQ obtained a P@1 of 97:17 on the out-of-domain data. The feature functions are domain independent although they are evaluated on the user's data. P@1 of GSpell on these queries was 80:19.

The third experiment involved training the ranker on the union of the first entity inbox folder and the first entity sent mail folder and testing the resulting model on the second entity folder. The third experiment involved generating candidates for the queries in the second entity folder from the two first entity folders instead of from the second entity folder to test the effect of user data driven candidate generation in SpEQ. In the third experiment P@1 dropped by 96:12% (i.e. from 97:17 to 3:77). In just 15% of test queries did the desired query return any search results on the two first entity folders. Thus demonstrating that user data driven candidate generation brings non-trivial value and that candidates generated from a different user's data or general purpose corpus are not the personalized corrections that the user is seeking.

The fourth experiment involved training the ranker on the union of the first entity inbox folder and the first entity sent mail folder and testing the resulting model on the second entity folder. The fourth experiment involved using a subset of features for training and testing. Table 3 shows the performance of SpEQ with various subsets of features from the fourth experiment. As Table 3 shows, each group of features improves the performance of SpEQ. However, it was not possible to evaluate contextual features since the test queries were not created by a process of natural use by a user that made those features.

TABLE 3

Precision @1 as increasing subsets of features

| Feature set | Precision @1 |
| --- | --- |
| Language Model + Edit distance | 81.19 |
| Language Model + Translation Models | 83 |
| Language Model + Translation Models + Content based features | 97.17 |

The fifth experiment involved training the ranker on the union of the first entity inbox folder and the first entity sent mail folder and testing the resulting model on the correctly spelled queries in these query sets. A good spelling correction should correct misspelled queries but should not change the correctly spelled queries as that would be confusing to the user. Ideally, P@1 on correctly spelled queries should be 1:0 but in practice this may not be achievable. SpEQ handles correctly spelled queries with P@1 of 97:8%, which is a 2:2% drop relative to the ideal P@1. BSpEQ had a P@1 of 76:83 and GSpell had a P@1 of 93:22.

Table 4 provides a few examples highlighting differences between SpEQ and GSpell. In the example "fry ad campaine" and "premeir fenty" GSpell corrected one term but failed to correct the other. Note that the terms fry and penty are not misspellings per se however on the first entity folders, they do not give any result and are most likely to be a misspelling. In the next two examples "aborition debacle" and "exxom mobile meeting", GSpell corrects aborition and mobile to correct dictionary terms. However, it so happens that in the first entity email account both of these terms happen to be misspelled repeatedly by the sender and in such case it would be more helpful to the user to retain the misspelling in the provided correction. In the examples "john catz" and "jollie birthday" GSpell corrects john and jollie to more commonly observed spelling jon and jollie. However, in the first entity email account, the contacts are spelled as John Katz and Tara Jollie, which again illustrates the performance of correcting the query in the context of user's email account

TABLE 4

Qualitative comparison of SpEQ and GSpell

| User query | Desired query | GSpell | SpEQ |
| --- | --- | --- | --- |
| fry ad | frye ad | fry ad | frye ad |
| campaine | campaign | campaign | campaign |
| premeir fenty | premier fentie | premier fenty | premier fentie |
| aborition debacle | aborition debacle | aborition debacle | aborition debacle |
| exxom mobile meeting | exxon mobile meeting | exxon mobil meeting | exxon mobile meeting |
| john catz | john katz | jon katz | john katz |
| jollie birthday | jollie birthday | jolie birthday | jollie birthday |

Example Clauses

A: A method comprising: mining at least one email repository; defining at least two features for candidate correction of an email query as at least two defined features based on at least one of: content from the email repository; a language model; a translation model; or context of the email repository; generating candidate corrections for the email query from the at least two defined features; ranking candidate corrections based at least on the defined features; and identifying at least one correction from the email repository according to rank associated with the candidate corrections.

B: A method as paragraph A recites, wherein at least a part of the email repository is associated with an entity from which the email query is received.

C: A method as either paragraph A or B recites, wherein ranking the candidate corrections is performed according to at least one statistical ranking algorithm.

D: A method as any one of paragraphs A-C recites, wherein the content from the email repository includes content of email fields including at least one of a contact fields, a subject field, or a body field.

E: A method as any one of paragraphs A-D recites, wherein context of the email repository includes at least one of: a time window of recent emails having a subject or contact field associated with defined features, or a frequency of emails received from, or sent to, a contact.

F: A method as any one of paragraphs A-E recites, wherein at least one of the candidate corrections being generated for the email query from the defined features represents a misspelling of a known word.

G: A method as any one of paragraphs A-F recites, further comprising: matching at least one of the candidate corrections to data from the email repository; and omitting a candidate correction of the candidate corrections from the ranking in an event the candidate correction is not matched to data from the email repository.

H: A method as any one of paragraphs A-G recites, further comprising identifying at least one email from the email repository containing at least one match to at least one of the candidate corrections without matching the email query.

I: A method as any one of paragraphs A-G recites, further comprising identifying at least one email from the email repository containing at least one match to at least one of the candidate corrections matching the email query.

J: A method as any one of paragraphs A-H recites, wherein the email repository includes multiple folders associated with an entity from which a same email query is received; and further comprising: identifying at least a first email from the email repository associated with a first of the multiple folders, the first email containing at least a first match to at least one of the candidate corrections without matching the email query; identifying at least a second email from the email repository associated with a second of the multiple folders, the second email containing at least a second match to at least one of the candidate corrections without matching the email query; and the first match differing from the second match.

K: A method as paragraphs A-G and I recites, wherein the email repository includes multiple folders associated with an entity from which a same email query is received; and further comprising: identifying at least a first email from the email repository associated with a first of the multiple folders, the first email containing at least a first match to at least one of the candidate corrections matching the email query; identifying at least a second email from the email repository associated with a second of the multiple folders, the second email containing at least a second match to at least one of the candidate corrections matching the email query; and the first match differing from the second match.

L: A method as paragraphs A-H and J recites, wherein the email repository is associated with at least two entities from which a same email query is received; and further comprising: identifying at least a first email from the email repository associated with a first of the at least two entities, the first email containing at least a first match to at least one of the candidate corrections without matching the email query; identifying at least a second email from the email repository associated with a second of the at least two entities, the second email containing at least a second match to at least one of the candidate corrections without matching the email query; and the first match differing from the second match.

M: A method as paragraphs A-G and I recites, wherein the email repository is associated with at least two entities from which a same email query is received; and further comprising: identifying at least a first email from the email repository associated with a first of the at least two entities, the first email containing at least a first match to at least one of the candidate corrections matching the email query; identifying at least a second email from the email repository associated with a second of the at least two entities, the second email containing at least a second match to at least one of the candidate corrections matching the email query; and the first match differing from the second match.

N: A computer readable medium having computer-executable instructions thereon, the computer-executable instructions to configure a computer to perform a method as any one of paragraphs A-M recites.

O: A device comprising: a computer-readable media having computer-executable instructions thereon to configure a computer to perform a method as any one of paragraphs A-M recites, the processing unit adapted to execute the instructions to perform the method as any one of paragraphs A-M recites.

P: A device comprising: a computer-readable media having thereon a plurality of modules and an email repository, for instance from a data store; a processing unit operably coupled to the computer-readable media, the processing unit adapted to execute modules of the plurality of modules comprising: an feature function module configured to identify features from email data in the email repository; a candidate generation module configured to generate candidate corrections corresponding to an email query, the candidate corrections being based at least in part on the email data; a ranking module configured to rank the candidate corrections based at least in part on the features from the email data upon which the candidate corrections are based.

Q: A device as paragraph P recites, wherein the feature function module includes at least one module comprising: a language model module configured to score candidate corrections; a translation model module configured to score lexical similarity of candidate corrections; a content-based features module configured to score candidate corrections according to where respective of the candidate corrections occur in content of the email data, or a contextual features module configured to score candidate corrections according to whether respective of the candidate corrections occur in a defined time window of recent emails.

R: A device as either paragraph P or Q recites, wherein the translation model module is configured to employ at least one translation model of edit distance or fuzzy match.

S: A device as any one of paragraphs P-R recites, wherein the translation model module is configured to employ an edit distance model to obtain an edit distance score, wherein the edit distance score gives different weights to different character edits based on physical distance between two characters on an input device, such as a physical keyboard, a soft keyboard, a touchscreen.

T: A device as any one of paragraphs P-S recites, wherein the content-based features module is configured to treat output of at least one of the language model module or the translation model module as a feature.

U: A device as any one of paragraphs O-T recites, wherein the content-based features module is configured to score content-based features according to at least one of: subject cover, a portion or fraction of mails containing at least one candidate token of the candidate corrections in the subject line; subject match, a maximum of a portion or fraction of candidate tokens of the candidate corrections appearing in any single subject line in the email data; key phrase cover, a set covering the maximum number of candidate tokens of the candidate corrections contained in phrases in the email data in the email repository; contact match, a portion or fraction of candidate tokens that are present in at least one contacts of at least one email account in the email data in the email repository; or too many emails a Boolean function to evaluate whether the candidate returns a number of emails above a user definable or pre-defined threshold.

V: A device as any one of paragraphs O-U recites, wherein the contextual features module is configured to score contextual features according to at least one of: recent subject match, a portion or fraction of candidate tokens appearing in a subject line in the email data in the email repository for a time window of recent emails; recent contact match, a portion or fraction of candidate tokens appearing in a contact in the email data in the email repository for a time window of recent contact interactions; frequent contact match, a portion or fraction of candidate tokens that are present more than a certain number of times in the email data in the email repository for a time window of recent contact interactions and/or more than a certain number of times in the email data in the email repository for a time window of the email data; or device match, a portion or fraction of candidate tokens that are present with an indication of input from a particular input type.

W: A computer-readable medium having thereon computer-executable instructions, the computer-executable instructions upon execution configuring a computer to perform operations comprising: identifying a plurality of tokens in an email query; identifying features associated with respective of the tokens; creating respective vectors of the features associated with respective of the tokens; identifying candidate corrections for the respective tokens; and combining the respective vectors to rank the candidate corrections.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, 200, and/or 300 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method for automatically correcting words in an email query, the method comprising:
    receiving an email query for mining at least one email repository, wherein the email query comprises at least one misspelled word;
    determining two or more features for personalized candidate spelling correction, wherein at least one feature comprises contextual feature of emails in at least one email repository, and wherein the context feature comprises one or more of:
        subject lines,
        frequent contacts,
        recent contacts, and
        input device types;
    generating at least one personalized candidate spelling correction for the email query based on the two or more determined features;
    ranking the at least one personalized candidate spelling corrections based at least in part on a weighted score of two or more determined features;
    determining at least one personalized spelling correction for the at least one email query from the ranked personalized candidate spelling corrections; and
    applying the at least one personalized spelling correction to the email query to produce a second email query with automatically corrected words.

2. A method as claim 1 recites, wherein at least a part of the email repository is associated with an entity from which the email query is received.

3. A method as claim 1 recites, wherein ranking the personalized candidate spelling corrections is performed based on at least one statistical ranking.

4. A method as claim 1 recites, wherein the contextual feature of emails in the at least one email repository further comprises at least one of a time range of recent emails having a subject and contact field associated with the determined features.

5. A method as claim 1 recites, wherein the at least one personalized candidate spelling correction comprises a misspelling of a known word based at least in part on ranking associated with the personalized candidate spelling corrections.

6. A method as claim 1 recites, further comprising:
    matching at least one of the personalized candidate spelling corrections to data from the email repository; and
    removing one or more personalized candidate spelling corrections from the ranking personalized candidate spelling corrections based on the matched data.

7. A method as claim 1 recites, further comprising identifying at least one email from the email repository, wherein the at least one email contains at least one of the personalized candidate spelling corrections without matching words in the email query.

8. A method as claim 1 recites, further comprising identifying at least one email from the email repository, wherein the at least one email contains at least one of the personalized candidate spelling corrections with matching words in the email query.

9. A method as claim 1 recites, wherein the email repository includes at least two subdivisions associated with an entity from which a same email query is received; and further comprising:
   determine at least a first email from the email repository associated with a first subdivision, wherein the first email contains at least a first match of words with at least one of the personalized candidate spelling corrections, and wherein the first match of words comprise at least one of the misspelled words failing to match emails based on the email query;
   determine at least a second email from the email repository associated with a second subdivision, wherein the second email contains at least a second match of words with at least one of the personalized candidate spelling corrections, and wherein the first match of words comprise at least one of the misspelled words failing to match emails based on the email query; and
wherein the first match differs from the second match.

10. A method as claim 1 recites, wherein the email repository includes at least one subdivision associated with an entity from which an email query is received; and further comprising:
   identifying at least a first email from the email repository associated with a first subdivision, the first email containing at least a first match to at least one of the personalized candidate spelling corrections matching the email query;
   identifying at least a second email from the email repository associated with a second subdivision, the second email containing at least a second match to at least one of the personalized candidate spelling corrections matching the email query; and the first match differing from the second match.

11. A method as claim 1 recites, wherein the email repository is associated with at least two entities from which a same email query is received; and further comprising:
   identifying at least a first email from the email repository associated with a first of the at least two entities, the first email containing at least a first match to at least one of the personalized candidate spelling corrections without matching the email query;
   identifying at least a second email from the email repository associated with a second of the at least two entities, the second email containing at least a second match to at least one of the personalized candidate spelling corrections without matching the email query; and the first match differing from the second match.

12. A method as claim 1 recites, wherein the email repository is associated with at least two entities from which a same email query is received; and further comprising:
   identifying at least a first email from the email repository associated with a first of the at least two entities, the first email containing at least a first match to at least one of the personalized candidate spelling corrections matching the email query;
   identifying at least a second email from the email repository associated with a second of the at least two entities, the second email containing at least a second match to at least one of the personalized candidate spelling corrections matching the email query; and the first match differing from the second match.

13. A computing device, comprising:
   at least one processing unit; and
   at least one memory storing computer executable instructions for correcting a plurality of misspelled words in emails, the instructions when executed by the at least processing unit causing the computing device to:
   identify, by a feature function module, features from email data in the email repository, wherein the feature function module comprises context-based features module configured to score personalized candidate spelling corrections based at least on where personalized candidate spelling corrections occur in context of the email data, and wherein the context-based features module is configured to treat output of a translation model module as a feature;
   generate, by a candidate generation module, the personalized candidate spelling corrections corresponding to a first email query, wherein the personalized candidate spelling corrections being based at least in part on the email data; and
   rank, by a ranking module, the personalized candidate spelling corrections based at least in part on a weighted score of the features from the email data;
   applying the ranked personalized candidate spelling corrections to the email query to produce a second email query with automatically corrected words.

14. A computing device as claim 13 recites, wherein the context-based features module is further configured to treat output of a language model module as a feature.

15. A computing device as claim 13 recites, further comprising a content-based features module, wherein the content-based features module is configured to score content-based features based on at least one of:
   subject cover, wherein the subject cover comprises at least a part of email data containing at least one candidate token of the personalized candidate spelling corrections in the subject line;
   subject match, wherein the subject match comprises at least one candidate token associated with the personalized candidate spelling corrections appearing in at least one subject line in the email data;
   key phrase cover, wherein the key phrase cover comprises a score based on a number of candidate tokens associated with the personalized candidate spelling corrections contained in phrases in the email data;
   contact match, wherein the contact match comprises at least one candidate token associated with at least one contact of at least one email account in the email data; and
   excessive emails indicator, wherein the excessive emails indicator indicates when a number of retrieved emails based on executing the second email query using the ranked personalized candidates corrections is greater than a threshold.

16. A computing device as claim 13 recites, wherein the feature function module further comprises at least one of:
   the translation model module configured to score lexical similarity of personalized candidate spelling corrections; and
   a content features module configured to score personalized candidate spelling corrections according to whether respective of the personalized candidate spelling corrections occur in content of the email data.

17. A computing device as claim 16 recites, wherein the translation model module is configured to employ at least one translation model of edit distance or fuzzy match.

18. A computing device as claim 16 recites, wherein the context-based features module is configured to score context-based features according to at least one of:
   recent subject match, wherein the recent subject match comprises at least a part of candidate tokens appearing in a subject line in the email data in the email repository for a time window of recent emails;

recent contact match, wherein the recent contact match comprises at least a part of candidate tokens appearing in a contact in the email data in the email repository for a time window of recent contact interactions;

frequent contact match, wherein the frequent contact match comprises at least a part of candidate tokens that are present more than a certain number of times in the email data in the email repository for a time window of recent contact interactions, and wherein the frequent contact match further comprises at least a part of candidate tokens appearing in the email data in the email repository more frequently than a threshold frequency for a time window of the email data; and device match, wherein the device match comprises at least a part candidate tokens present with an indication of input from a particular input type.

19. A computer storage medium having thereon computer executable instructions, the computer-executable instructions upon execution configuring a computer to perform operations comprising:

extracting a plurality of tokens in an email query;

determine at least one feature associated with respective of the tokens, wherein the feature comprises at least one context of email;

generating a vector of the at least one feature associated with the tokens;

generating one or more personalized candidate spelling corrections associated with at least one of the tokens;

ranking the one or more personalized candidate spelling corrections based at least in part on the vector of the feature associated with the tokens;

selecting at least one word from the personalized candidate spelling corrections based on a number of emails associated with the personalized candidate spelling correction;

replacing at least one word in the email query with the selected at least one word from the personalized candidate spelling corrections;

executing the email query; and retrieving at least one email from an email repository based on a result of the executed email query.

20. A computer storage medium as claim 19 recites, wherein the contextual aspects include at least one of an indication of input from a particular input type, an indication of input from a device type, and/or an indication of input from a particular device.

* * * * *